(12) United States Patent
Takayama

(10) Patent No.: US 6,313,066 B1
(45) Date of Patent: Nov. 6, 2001

(54) DECOLORABLE IMAGE FORMING MATERIAL AND DECOLORING METHOD OF THE SAME

(75) Inventor: Satoshi Takayama, Kawasaki (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/539,320

(22) Filed: Mar. 30, 2000

(30) Foreign Application Priority Data

Mar. 31, 1999 (JP) .................................................. 11-094207

(51) Int. Cl.$^7$ .................................................. B41M 5/132
(52) U.S. Cl. ............................................ 503/201; 503/214
(58) Field of Search .................................. 503/201, 205, 503/214

(56) References Cited

U.S. PATENT DOCUMENTS

| | | | |
|---|---|---|---|
| 5,407,890 | 4/1995 | Ishikawa | 503/201 |
| 5,663,115 | 9/1997 | Naito et al. | 503/201 |
| 5,849,651 | 12/1998 | Takayama et al. | 503/201 |
| 5,922,115 | 7/1999 | Sano et al. | 106/31.32 |

FOREIGN PATENT DOCUMENTS

| | | |
|---|---|---|
| 0 980 028 | 2/2000 | (EP) . |
| 0 987 123 | 3/2000 | (EP) . |
| 58-111873 | 7/1983 | (JP) . |
| 01-138274 | 5/1989 | (JP) . |
| 01-138275 | 5/1989 | (JP) . |
| 07-025167 | 1/1995 | (JP) . |

*Primary Examiner*—Bruce Hess
(74) *Attorney, Agent, or Firm*—Oblon, Spivak, McClelland, Maier & Neustadt, P.C.

(57) ABSTRACT

A decolorable image forming material containing a color former, a developer and a binder resin, in which the binder resin has a property that it is compatible with the color former when the material is in contact with a solvent and that it keeps the compatible state when the solvent is removed, or has a property that it shifts an equilibrium between the color former and the developer to a non-developed side when the temperature of the material is raised and that it keeps the state shifted to the non-developed side when the temperature of the material is lowered.

4 Claims, 1 Drawing Sheet

DECOLORABLE IMAGE FORMING MATERIAL AND DECOLORING METHOD OF THE SAME

CROSS-REFERENCE TO RELATED APPLICATIONS

This application is based upon and claims the benefit of priority from the prior Japanese Patent Application No. 11-094207, filed Mar. 31, 1999, the entire contents of which are incorporated herein by reference.

BACKGROUND OF THE INVENTION

The present invention relates to an image forming material that can be formed into an image by electrophotography, thermal transfer recording, writing tools or printing, and that can be decolored by control of thermal hysteresis or by contact with a solvent.

With the recent progress of office automation, the amounts of various pieces of information are significantly increasing, and information output is increasing accordingly. Information output is represented by display output and hard copy output from printers to paper sheets. However, display output requires a large-scale circuit board in a display unit and hence has problems in portability and cost. Hard copy output uses a large amount of paper as a recording medium when the information amount increases, leading to problems about the protection of resources. In addition, in order to recycle paper sheets on which images are printed with a printer or a copier, it is necessary to use a large amount of bleaching agent and water, which brings about a rise in recycling cost. Thus, it is proposed to reduce the consumption of paper sheets substantially by printing an image on a paper sheet using a decolorable image forming material, decoloring the formed image to return the paper sheet to a blank sheet, reusing the blank sheet, and recycling the sheet at the time when damage of the sheet becomes serious so that the sheet cannot be reused.

Recently, rewritable paper has been proposed in order to reuse hard copy paper sheets. However, this rewritable paper is applicable only to thermal recording and is not recyclable because it is made of special paper, although it is reusable.

Heretofore, an image forming material that can be decolored by heating has been proposed in, for example, Published Unexamined Japanese Patent Application No. 7-81236. The image forming material includes a color former such as a leuco dye, a developer, and an organophosphoric compound having decoloring ability. When such an image forming material is used, however, decoloration is insufficient and, as a result, a paper sheet is hard to return to the blank state.

We have been developing a decolorable image forming material in which a color former, a developer and a decolorant having high affinity with the developer are dispersed in a binder resin. Now, it becomes possible to attain an excellent decolored state in various material systems by selecting an appropriate decolorant. However, a complete decolored state is not always obtained in all material systems. Thus, it has been recognized that components of the decolorable image forming material can be desirably selected from a wide variety of materials.

BRIEF SUMMARY OF THE INVENTION

An object of the present invention is to provide an image forming material, containing no decolorant, that can form a clear image and that the image thereof can be decolored well.

According to an aspect of the present invention, there is provided a decolorable material comprising a color former, a developer and a binder resin, wherein the binder resin has a property that it is compatible with the color former when the material is in contact with a solvent and that it keeps the compatible state when the solvent is removed.

According to another aspect of the present invention, there is provided a decolorable material comprising a color former, a developer and a binder resin, wherein the binder resin has a property that it shifts an equilibrium between the color former and the developer to a non-developed side when the temperature of the material is raised and that it keeps the state shifted to the non-developed side when the temperature of the material is lowered.

According to still another aspect of the present invention, there is provided a paper medium comprising a paper sheet and a decolorable material applied to the paper sheet and comprising a color-former, a developer and a binder resin, wherein the binder resin has a property that it shifts an equilibrium between the color former and the developer to a non-developed side when the temperature of the material is raised and that it keeps the state shifted to the non-developed side when the temperature of the material is lowered.

According to yet another aspect of the present invention, there is provided a decoloring method of an image using a material comprising a color former, a developer and a binder resin, comprising steps of heating the image forming material so that the binder resin adsorbs the color former when the temperature of the material is raised, thereby shifting an equilibrium between the color former and the developer to a non-developed side, and keeping the state shifted to the non-developed side when the temperature of the material is lowered.

According to yet another aspect of the present invention, there is provided a decoloring method of an image using a material comprising a color former, a developer and a binder resin, which is applied to a paper sheet, comprising steps of heating the paper sheet so that the binder resin adsorbs the color former and a cellulose component of the paper sheet adsorbs the developer when the temperature of the paper sheet is raised, thereby shifting an equilibrium between the color former and the developer to a non-developed side, and keeping the state shifted to the non-developed side when the temperature of the paper sheet is lowered.

According to yet another aspect of the present invention, there is provided a decoloring method of an image using a material comprising a color former, a developer and a binder resin, which is applied to a paper sheet, comprising steps of bringing the image forming material on the paper sheet into contact with a solvent, thereby making the binder resin and the color former into a compatible state and keeping the compatible state when the solvent is removed.

In the present invention, the binder resin used is preferably a non-polar resin. In the present invention, a binder resin consisting of a copolymer of a polar monomer and a non-polar monomer may be used. In this case, the copolymer preferably comprises 90% or more by weight of the non-polar monomer.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed descrip

DETAILED DESCRIPTION OF THE INVENTION

The present invention will be more specifically described hereinafter.

A decolorable image forming material of the present invention comprises a color former, a developer and a binder but does not comprise any decolorant. The image forming material is prepared by dispersing the color former and the developer (these may be referred to as a dye components), in a color-developed state, in the binder resin. When the image forming material is applied to a paper sheet by a method such as electrophotography, a clear image can be formed. Images of the image forming material can be decolored by contact with a solvent or by heating.

In a first decolorable image forming material of the present invention, used is a binder resin having a property that it is compatible with the color former when the material is in contact with a solvent and that it keeps the compatible state when the solvent is removed. That the binder resin is compatible with the color former when the material is in contact with a solvent means a phenomenon that the color former diffuses in the binder resin that is in a swelled state by the solvent, and release of the color former from the binder resin is made difficult by steric hindrance or interaction. On the other hand, the binder resin has low affinity with the developer.

Figures 1A, 1B:
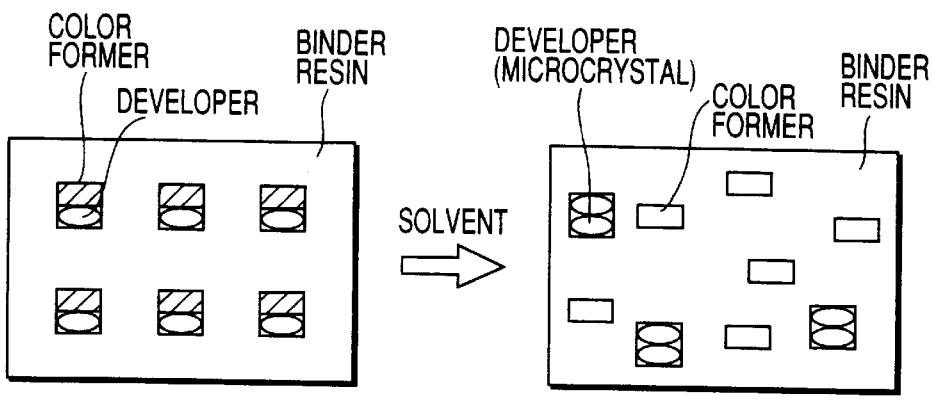
- FIG. 1A is a schematic view showing a color-developed state of an image forming material comprising a color former, a developer and a binder, according to the present invention.
FIG. 1B is a schematic view showing an decolored state of the image forming material by contact with a solvent.

Referring to FIGS. 1A and 1B, the following will describe a principle of decoloration of an image of the image forming material according to the present invention in which a color former and a developer are dispersed in a binder resin. As shown in FIG. 1A, when an image is formed on a paper sheet by using the image forming material of the present invention, the color former and the developer dispersed in the binder interact with each other and are in a color-developed state. When the image forming material on the paper sheet is brought into contact with a solvent, the color former and the developer do not interact with each other, so that the color is lost, i.e., the image is decolored. This is because the color former is compatible with the binder resin but the developer has low affinity with the binder resin. Further, when the solvent is removed due to evaporation, the color former and the developer are separated in the binder resin, so that the dye components are fixed in a colorless state (FIG. 1B).

Figures 2A, 2B:
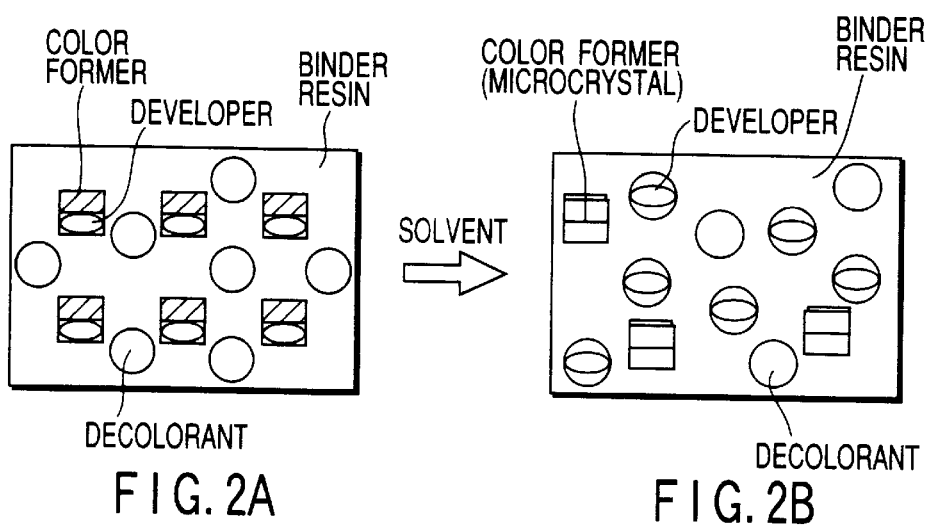
FIG. 2A is a schematic view showing a color-developed state of an image forming material comprising a color former, a developer, a decolorant and a binder resin.
FIG. 2B is a schematic view showing an decolored state of the image forming material by contact with a solvent.

For reference, FIGS. 2A and 2B show a principle of decoloration of an image of the image forming material in which a color former, a developer and a decolorant having high affinity with the developer are dispersed in a binder resin. As shown in FIG. 2A, when an image is formed on a paper sheet by using this image forming material, the color former and the developer dispersed in the binder interact with each other and are in a color-developed state. When the image forming material on the paper sheet is brought into contact with a solvent, the color former and the developer do not interact with each other, so that the color is lost, i.e., the image is decolored. This is because the developer is compatible with the decolorant but the color former has low affinity with the decolorant. Further, when the solvent is removed due to evaporation, the color former and the developer, which is captured by the decolorant, are separated in the binder resin, so that the dye components are fixed in a colorless state (FIG. 2B).

As described above, the principles of decoloration of the image forming materials shown in FIGS. 1A and 1B and in FIGS. 2A and 2B are similar, but are different in that the color former and the binder resin have high affinity with each other in the case shown in FIGS. 1A and 1B and the developer and the decolorant have high affinity with each other in the case shown in FIGS. 2A and 2B. As understood from this fact, in order to attain an excellent decolored state, it is sufficient that either one of the color former and the developer is fixed. Of course, both of the color former and the developer may be separately fixed at the same time.

Figure 3:
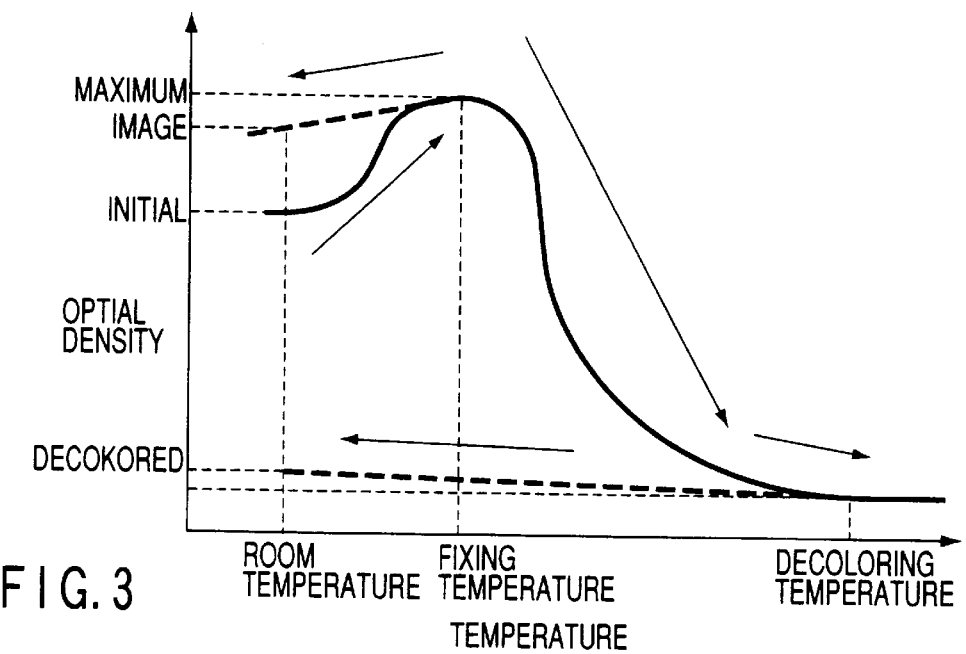
FIG. 3 is a graph showing temperature dependency of the optical density of an image forming material comprising a color former, a developer and a binder, according to the present invention.

The image of the image forming material of the present invention can also be decolored by heating. The decoloring method by heating is advantageous for treating, in a batch, a bundle of paper sheets on which the decolorable image forming material applied. The principle of decoloration in this case would be either one of the following two. The first principle is substantially the same as the case shown in FIGS. 1A and 1B. That is, when the material is heated, the binder resin becomes selectively compatible with the color former, so that the color is lost. According to the second principle, equilibrium between the color former and the developer is shifted to a non-developed side when the temperature of the material is raised, and the state shifted to the non-developed side is kept by means of the binder resin when the temperature of the material is lowered. The second principle will be described with reference to FIG. 3.

In a state that an image is formed on a paper sheet using the image forming material of the present invention, the rate of the color former and the developer that interact with each other is large, and they are dispersed in a color-developed state in the binder resin. The optical density thereof shows the maximum value as the temperature of the material is raised. Even if the image forming material is cooled from this state, the color-developed state is kept. However, when the temperature is further raised, the equilibrium of interaction between the color former and the developer in the binder is shifted to a non-developed side (a non-bonded side). In other words, the rate of the color former and the developer that interact with each other becomes extremely small. As a result, the optical density is decreased as the temperature of the material is raised, so that the color is lost. At that time, the binder resin adsorbs the color former and a cellulose component of the paper sheet adsorbs the developer. Therefore, even if the temperature of the material is lowered to room temperature, this state can be substantially kept, so that the decolored state is kept. At temperatures below the glass transition temperature of the binder resin, the decolored state does not return easily to the color-developed state in spite of the shift of the equilibrium.

The components used in the image forming material of the present invention will now be described in detail.

Examples of the color former are electron-donating organic substances such as leucoauramines, diarylphthalides, polyarylcarbinoles, acylauramines, arylauramines, Rhodamine B lactams, indolines, spiropyrans, and fluorans.

Specific examples of the color former are Crystal Violet lactone (CVL), Malakite Green lactone, 2-anilino-6-(N-cyclohexyl-N-methylamino)-3-methylfluoran, 2-anilino-3-methyl-6-(N-methyl-N-propylamino)-fluoran, 3-[4-(4-phenylaminophenyl)aminophenyl]amino-6-methyl-7-chlorofluoran, 2-anilino-6-(N-methyl-N-isobutylamino)-3-methylfluoran, 2-anilino-6-(dibutylamino)-3-methylfluoran, 3-chloro-6-(cyclohexylamino)-fluoran, 2-chloro-6-(diethylamino)fluoran, 7-(N,N-diethylamino)-3-(N,N-diethylamino)fluoran, 3,6-bis(diethylamino)fluoran-γ-(4'-nitroanilino)lactam, 3-diethylaminobenzo[a]fluoran, 3-dietylamino-6-methyl-7-aminofluoran, 3-diethylamino-7-xylidinofluoran, 3-(4-diethylamino-2-ethoxyphenyl)-3-(1-ethyl-2-methylindole-3-yl)-4-azaphthalide, 3-(4-diethylaminophenyl)-3-(1-ethyl-2-methylindole-3-yl) phthalide, 3-diethylamino-7-chloroanilinofluoran, 3-diethylamino-7,8-benzofluoran, 3,3-bis(1-n-butyl-2-methylindole-3-yl)phthalide, 3,6-dimethylethoxyfluoran, 3,6-diethylamino-6-methoxy-7-aminofluoran, DEPM, ATP, ETAC, 2-(2-chloroanilino)-6-dibutylaminofluoran, Crystal Violet carbinol, Malachite Green carbinol, N-(2,3-dichlorophenyl)leucoauramine, N-benzoylauramine, Rhodamine B lactam, N-acetylauramine, N-phenylauramine, 2-(phenyliminoethanedilydene)-3,3-dimethylindoline, N,3,3-trimethylindolinobenzospiropyran, 8'-methoxy-N,3,3-trimethylindolinobenzospiropyran, 3-diethylamino-6-methyl-7-chlorofluoran, 3-diethylamino-7-methoxyfluoran, 3-diethyamino-6-benzyloxyfluoran, 1,2-benzo-6-diethyaminofluoran, 3,6-di-p-toluidino-4,5-dimetylfluoran, phenylhydrazide-γ-lactam, and 3-amino-5-methylfluoran. These color formers can be used singly or in the form of a mixture of two or more species. If color formers are selected properly, a variety of color developed states can be obtained, and thus a multicolor image can be formed.

Examples of the developer are phenols, metal phenolates, carboxylic acids, metal carboxylates, benzophenones, sulfonic acids, sulfonates, phosphoric acids, metal phosphates, acidic phosphoric esters, acidic phosphoric ester metal salts, phosphorous acids, and metal phosphites. These developers can be used singly or in the form of a mixture of two or more species.

Specific examples of the developer are gallic acid; gallates such as methyl gallate, ethyl gallate, n-propyl gallate, i-propyl gallate, and butyl gallate; dihydroxybenzoic acids and their esters such as 2,3-dihydroxybenzoic acid and 3,5-dihydroxybenzoic acid methyl; acetophenone derivatives such as 2,4-dihydroxyacetophenone, 2,5-dihydroxyacetophenone, 2,6-dihydroxyacetophenone, 3,5-dihydroxyacetophenone, and 2,3,4-trihydroxyacetophenone; benzophenone derivatives such as 2,4-dihydroxybenzophenone, 4,4'-dihydroxybenzophenone, 2,3,4-trihydroxybenzophenone, 2,4,4'-trihydroxybenzophenone, 2,2',4,4'-tetrahydroxybenzophenone, and 2,3,4,4'-tetrahydroxybenzophenone; biphenols such as 2,4'-biphenol and 4,4'-biphenol; and polyhydric phenols such as 4-[(4-hydroxyphenyl)methyl]-1,2,3-benzenetriol, 4-[(3,5-dimethyl-4-hydroxyphenyl)methyl]-1,2,3-benzenetriol, 4,6-bis[(3,5-dimethyl-4-hydroxyphenyl)methyl]-1,2,3-benzenetriol, 4,4'-[1,4-phenylenebis(1-methylethylidene)bis(benzene-1,2,3-triol)], 4,4'-[1,4-phenylenebis(1-methylethylidene)bis(1,2-benzenediol)], 4,4',4"-ethylidenetrisphenol, 4,4'-(1-methylethylidene)bisphenol, and methylenetris-p-cresol. These developers can be used singly or in the form of a mixture of two or more species.

In the image forming material of the present invention, it is desired to take the content of polar groups in the binder resin and the compatibility of the binder resin with the color former into consideration. As the content of the polar groups in the binder resin becomes lower, the optical density of the image formed using the image forming material prepared by kneading generally becomes higher and simultaneously the compatibility of the binder resin with the color former also becomes higher. Therefore, it is preferable to use a resin close to non-polar as the binder resin capable of improving the contrast between the developed state and the decolored state. Specifically, a binder resin composed only of a non-polar monomer or a binder resin that is a copolymer of a polar monomer and a non-polar monomer and comprises 90% or more by weight of non-polar monomer.

Examples of suitable binder resin used in the present invention are polystyrene, polystyrene derivatives and styrene copolymers. Specific examples of a styrene-based monomer used for producing these polymers are styrene, o-methylstyrene, m-methylstyrene, p-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, p-phenylstyrene, p-chlorostyrene, and 3,4-dichlorostyrene. These monomers can be used singly or in a combination of two or more species.

A styrene-based monomer may be copolymerized with a monomer having a polar group. Examples of monomer having a polar group are methyl methacrylate, ethyl methacrylate, isobutyl methacrylate, cyclohexyl methacrylate, ethylhexyl methacrylate, lauryl methacrylate, stearyl methacrylate, vinyl acetate, vinyl propionate, methacrylonitrile, dimethyl maleate, diethyl maleate, dimethyl fumarate, dibutyl fumarate, dimethyl itaconate, dibutyl itaconate, methylvinylether, ethylvinylether, n-butylvinylether, and isobutylether. These monomers having a polar group can be used singly or as a combination of two or more species. Specific examples of suitable binder resin consisting of a copolymer are styrene-n-butyl methacrylate, styrene-isobutyl methacrylate, styrene-ethyl acrylate, styrene-n-butyl acrylate, styrene-methyl methacrylate, styrene-glycidyl methacrylate, styrene-dimethylaminoethyl methacrylate, styrene-diethylaminoethyl methacrylate, styrene-diethylaminopropyl acrylate, styrene-2-ethylhexyl acrylate, styrene-butyl acrylate-N-(ethoxymethyl)acrylamide, styrene-ethyleneglycol methacrylate, styrene-4-hexafluorobutyl methacrylate, a styrene-butadiene copolymer, an acrylonitrile-acrylic rubber-styrene terpolymer, an acrylonitrile-styrene-acrylate terpolymer, a styrene-acrylonitrile copolymer, an acrylonitrile-chlorinated polystyrene-styrene terpolymer, an acrylonitrile-ethylenevinyl acetate-styrene terpolymer, a styrene-p-chlorostyrene copolymer, a styrene-propylene copolymer, styrene-butadiene rubber, a styrene-maleic ester copolymer, and a styrene-maleic anhydride copolymer.

In the case where a styrene-based monomer is copolymerized with another monomer such as butadiene and chloroprene, the weight ratio of these monomer components is desirably set to 10% or less.

A blend of polystyrene and polyacrylate can also be used. In this case, polyacrylate can be a homopolymer or a copolymer.

A blend of polystyrene-based polymer and polyester can also be used. Polyester is synthesized by reaction between a carboxylic acid and a polyhydric alcohol. Examples of the carboxylic acid monomer are terephthalic acid, fumaric acid, maleic acid, succinic acid, glutaric acid, adipic acid, pimelic acid, suberic acid, azelaic acid, sebacic acid, brassilic acid, pyromellitic acid, citraconic acid, glutaconic acid, mesaconic acid, itaconic acid, teraconic acid, phthalic acid, isophthalic acid, hemimellitic acid, mellophanic acid, trimesic acid, prehnitic acid, trimellitic acid, and their derivatives. Examples of the polyhydric alcohol are ethylene glycol, propylene glycol, butanediol, neopentyldiol, hexamethylenediol, heptanediol, octanediol, pentaglycerol, pentaerythritol, cyclohexanediol, cyclopentanediol, pinacol, glycerin, etherified diphenol, catechol, resorcinol, pyrogallol, benzenetriol, phloroglucinol, benzenetetraol, and their derivatives. These monomers can be used singly or in the form of a copolymer of two or more species. It is also possible to blend two or more polyesters.

The decolorable image forming material of the present invention can be applicable to electrophotographic toner, liquid ink, and a thermal transfer ink ribbon, etc. A softening point and a glass transition point represent thermal characteristics of, for example, the binder resin for toner. Binder resin suitable for toner preferably has a softening point of 60 to 190° C. and a glass transition point of 20 to 110°. The softening point is measured as a temperature ($T_{1/2}$) when the sample flow amount reaches the half value under conditions of nozzle: 1.0 mmø×10.0 mm, load: 30 kgf, heating rate: 3° C./min, and sample amount: 1.0 g by using a flow tester (CFT-500 manufactured by Shimadzu Corp.) The glass transition point is measured by DSC as the temperature of a shoulder value after melt quench. Binder resin suitable for a thermal transfer ink ribbon preferably has a glass transition point of 70° C. or less from a viewpoint of thermal transfer sensitivity.

Next, in the case where the image forming material of the present invention is used in various applications, usable materials other than a color former, a developer and a binder resin will be described.

A charge control agent may be used where the image forming material is used as toner. In the present invention, it is required that any color does not remain when the image is decolored, and therefore a charge control agent is preferably colorless or transparent. In view of this requirement, following negative charge control agents and positive charge control agents are suitable. Examples of the negative charge control agent are E-84 (zinc salicylate compound) manufactured by Orient Kagaku K.K., N-1, N-2, and N-3 (phenol-based compounds) manufactured by NIPPON KAYAKU CO. LTD., FCA-1001N (styrene-sulfonic acid-based resin) manufactured by FUJIKURA KASEI CO. LTD., and LR-147 manufactured by Nippon Carret Inc. Examples of the positive charge control agent are TP-302 (CAS#116810-46-9) and TP-415 (CAS#117342-25-2) manufactured by Hodogaya Chemical Co. Ltd., P-51 (quaternary amine compound) and AFP-B (polyamine oligomer) manufactured by Orient Kagaku K.K., and FCA-201PB (styrene-acrylic quaternary ammonium salt-based resin) manufactured by FUJIKURA KASEI CO. LTD.

When the image forming material of present invention is used for toner, a wax component can also be added to control the fixation. Examples of the wax component are long-chain aliphatic alcohol, long-chain aliphatic ketone, and long-chain aliphatic acid ester. The wax component preferably does not make the color former develop color. Therefore, the acid value of the wax component is preferably 10 or less.

The weight-average molecular weight of this wax component is preferably $10^2$ to $10^5$, and more preferably, $10^2$ to $10^4$. Low-molecular weight polypropylene, low-molecular weight polyethylene, low-molecular weight polybutylene, or low-molecular weight polyalkane may be used as a wax component, if the weight-average molecular weight is in the above range. The addition amount of the wax component is preferably 0.1 to 30 parts by weight, and more preferably, 0.5 to 15 parts by weight. For toner to be thermally fixed with heat rolls, the wax component is added to impart release property from the heat rolls. In this case, the content of the wax component is set to 5 parts by weight or less. In an electrophotographic toner to be fixed by pressure, the main component of the toner is the wax component, which constitutes a core of a microcapsule structure.

When the image forming material is used for toner, an external additive may be added to control the flowability, storage stability, blocking resistance, or photosensitive body polishing characteristics. As the external additive, silica fine particles, metal oxide fine particles, a cleaning assistant, and the like can be used. Examples of the silica fine particles are silicon dioxide, sodium silicate, zinc silicate, and magnesium silicate. Examples of the metal oxide fine particles are zinc oxide, magnesium oxide, zirconium oxide, strontium titanate, and barium titanate. Examples of the cleaning assistant are resin fine powders of polymethyl methacrylate, polyvinylidene fluoride, and polytetrafluoroethylene. These external additives may be subjected to surface processing to make hydrophilic. For negative charge toner, treatment agents such as a silane coupling agent, a titanium coupling agent, and silicone oil are used. For positive charge toner, treatment agents such as an amino silane-based compound and silicone oil having amine in a side chain are used. The addition amount of these external additives is preferably 0.05 to 5 parts by weight, and more preferably, 0.1 to 3.0 parts by weight with respect to 100 parts by weight of the toner. Silica fine particles whose number-average particle size of primary particles is 10 to 20 nm are often used, and particles up to 100 nm are also used. In the case of a material other than silica, particles having a large number-average particle size of, for example, 0.05 to 3 μm are used.

The particle size range of the decolorable toner according to the present invention is preferably such that the volume-average particle size is 6 to 20 μm, the content of particles of 5 μm or less is 2 to 20 number % in the number distribution, the content of particles of 5 μm or less is 0 to 5 volume % in the volume distribution, and the content of particles of 20 μm or more is 0 to 5 volume % in the volume distribution. These values are measured with Coulter Multisizer (Coulter Corp.) The conductivity of the decolorable toner is preferably $10^{11}$ to $10^{16}$ Ω·cm, and more preferably, $10^{13}$ to $10^{15}$ Ω·cm. In dual-component development, an iron powder, ferrite and magnetite coated with silicone resin or acrylic resin are used as a carrier. The conductivity of the carrier is preferably $10^9$ Ω·cm or less for an iron powder, about $10^6$ to $10^{15}$ Ω·cm for ferrite, and $10^{13}$ Ω·cm or more for magnetite. When a magnetic powder pulverized to about 50 μm is dispersed in a resin, the conductivity is preferably $10^{13}$ Ω·cm or more. The conductivity is measured by forming the toner into disk-like tablets 20 mm in diameter and 1 mm in thickness and applying a potential of 1 V×1 kHz to the tablets.

Next, a case where the image forming material of the present invention is applied to liquid ink will be described below. Solid components of the liquid ink containing a color former, a developer and a binder resin as main components like toner. As a liquid component, used is a solvent different from a decoloring solvent described later. Examples of suitable organic solvent used for ink are aliphatic hydrocarbons, alicyclic hydrocarbons and aromatic hydrocarbons. Examples of aliphatic hydrocarbon are hexane, octane, decan, dodecan, tetradecan, octene, decene, dodecene, and tetradecan, their isomers, and a mixture thereof represented by liquid paraffin. Examples of alicyclic hydrocarbon are cyclohexane, cyclooctane, cyclodecan, cyclododecane, cyclotetradecane, methylcyclohexane, dimethylcyclohexane, ethylcyclohexane, propylcyclohexane, terpene, menthane, limonene, dipentene, terpinolene, carane, carene, thujane, and thujene. Examples of aromatic hydrocarbon are benzene, toluene, xylene, ethylbenzene, propylbenzene, and diethylbenzene. In this case, polyolefin, polystyrene and the like are used for a vehicle resin. Water may be used as a solvent. In this case, a water-soluble resin such as gum arabic, shellac, dextrin, casein, and hydroxyethyl cellulose are used.

As a method of mixing or dispersing the color former and the developer into the binder resin, used is wet dispersion method that uses a solvent in a device such as a high-speed dissolver, roll mill, or ball mill, or melt kneading that uses a roll, pressure kneader, internal mixer, or screw extruder. As a mixing means, a ball mill, V-mixer, Forberg, or Henschel mixer can be used.

Next, a case where the image forming material of the present invention is applied to a thermal transfer ink ribbon will be described below. In a thermal transfer ink ribbon, a soft resin having a relatively low molecular weight and a low glass transition point is suitably used as a binder resin from a viewpoint of thermal transfer characteristics. Specific examples of binder resin are polyethylene, polypropylene, an ethylene-vinyl acetate copolymer, ethylene-ethyl acrylate copolymer, ethylene-maleic anhydride copolymer, ethylene-acrylate-maleic anhydride copolymer, propylene-vinyl acetate copolymer, propylene-ethyl acrylate copolymer, propylene-maleic anhydride copolymer, propylene-acrylate-maleic anhydride copolymer, butylene-vinyl acetate copolymer, butylene-butyl acrylate copolymer, butylene-maleic anhydride copolymer, and butylene-acrylate-maleic anhydride copolymer. It is also possible to use a styrene-acrylate copolymer having a relatively low molecular weight besides the above olefinic resin and a copolymer thereof. In this case, acrylate monomers such as n-butyl methacrylate, isobutyl methacrylate, ethyl acrylate, n-butyl acrylate, methyl methacrylate, glycidyl methacrylate, dimethylaminoethyl methacrylate, diethylaminoethyl methacrylate, diethylaminopropyl acrylate, 2-ethylhexyl acrylate, butyl acrylate-N-(methoxymethyl) acrylamide, ethylene glycol methacrylate, and 4-hexafluolobutyl methacrylate can be used. It is also possible to use a polyester-based resin having a relatively low molecular weight and a low glass transition point. In the case of a decolorable thermal transfer ribbon, a resin having 10% by weight of polar groups such as a polyolefin-based resin and low-molecular weight polystyrene resin highly compatible with a color former can also be used.

When the image forming material is used for a thermal transfer ink ribbon, a plasticizer may be added to a binder resin. As a plasticizer, wax having a low content of polar groups such as polyethylene wax or polypropylene wax is suitable. Appropriate ink film thickness for decolorable thermal transfer ink ribbon is determined from image density for minimum thickness and from thermal transfer characteristics for maximum thickness. More specifically, the thickness is preferably 0.5 to 20 µm, more preferably, 2 to 8 µm.

The decoloring solvent used in the present invention preferably has high affinity with a binder resin and is capable of penetrating into the image forming material. Examples of the decoloring solvent are ethers, ketones and esters. More specific examples are saturated ethers such as ethyl ether, ethyl propyl ether, ethyl isopropyl ether, isopentyl methyl ether, butyl ethyl ether, dipropyl ether, diisopropyl ether, ethyl isopentyl ether, dibutyl ether, dipentyl ether, diisopentyl ether, and dihexyl ether; unsaturated ethers such as ethyl vinyl ether, aryl ethyl ether, diaryl ether, and ethyl propargyl ether; ethers of dihydric alcohols such as 2-methoxyethanol, 2-ethoxyethanol, 2-butoxyethanol, 1,2-dimethoxyethane; cyclic ethers such as oxetane, tetrahydrofuran, tetrahydropyran, dioxolane, dioxane, and trioxane; saturated ketones such as acetone, methyl ethyl ketone, methyl propyl ketone, diethyl ketone, isopropyl methyl ketone, butyl methyl ketone, ethyl propyl ketone, isobutyl methyl ketone, pinacolone, methyl pentyl ketone, butyl ethyl ketone, dipropyl ketone, diisopropyl ketone, hexyl methyl ketone, isohexyl methyl ketone, heptyl methyl ketone, and dibutyl ketone; unsaturated ketones such as ethylidene acetone, allyl acetone, and mesityl oxide; cyclic kotones such as cyclopentanone, cyclohexanone, and cyclooctanone; and esters such as ethyl formate, propyl formate, butyl formate, isobutyl formate, pentyl formate, isopentyl formate, ethyl acetate, isopropyl acetate, propyl acetate, butyl acetate, isobutyl acetate, pentyl acetate, isopentyl acetate, sec-amyl acetate, hexyl acetate, allyl acetate, 2-methoxyethyl acetate, 2-ethoxyethyl acetate, 1,2-diacetoxy ethane, methyl propionate, ethyl propionate, propyl propionate, isopropyl propionate, butyl propionate, pentyl propionate, isopentyl propionate, sec-amyl propionate, 2-methoxypropyl acetate, 2-ethoxypropyl acetate, methyl butyrate, ethyl butyrate, propyl butyrate, isopropyl butyrate, butyl butyrate, pentyl butyrate, isopentyl butyrate, sec-amyl butyrate, methyl isobutyrate, ethyl isobutyrate, propyl isobutyrate, isopropyl isobutyrate, butyl isobutyrate, pentyl isobutyrate, isopentyl isobutyrate, sec-amyl isobutyrate, methyl valerate, ethyl valerate, propyl valerate, isopropyl valerate, butyl valerate, methyl hexanoate, ethyl hexanoate, propyl hexanoate, and isopropyl hexanoate. Examples of another solvents other than the above solvents are methylene chloride, γ-butyrolactone, β-propyolactone, N-methylpyrrolidinone, dimethyl formamide, dimethyl acetoamide and dimethyl sulfoxide. These solvents can be used singly or in the form of a mixture of at least two compounds.

A solvent having low affinity with the binder may be mixed with the above solvent. Examples of such a solvent are, for example, water, methyl alcohol, ethyl alcohol, propyl alcohol, isopropyl alcohol, butyl alcohol, isobutyl alcohol, pentyl alcohol, 2-pentyl alcohol, 3-pentyl alcohol, isopentyl alcohol, 1-hexanol, 2-hexanol, 3-hexanol, cyclopentanol, cyclohexanol, ethylene glycol, propylene glycol, butylene glycol, and glycerin.

Further, a solvent having high affinity with the binder may be used. Examples of such a solvent are, for example, toluene, ethylbenzene, propylbenzene, cumene, butylbenzene, isobutylbenzene, sec-butylbenzene, pentylbenzene, diethylbenzene, mesitylene, xylene, cresol, etylphenol, dimethoxybenzene, dimethoxytoluene, benzyl alcohol, tolyl carbinol, cumyl alcohol, acetophenone, propiophenone, hexane, pentane, heptane, octane, cyclohexane, cyclopentane, cycloheptane, cyclooctane, and petroleum fractions such as petroleum ether and benzene.

When a natural material such as ethylbutylate (pineapple oil) is used as a solvent, influence to environment is made extremely low, even if the solvent remains in waste produced when paper sheets including the image forming material are recycled.

If a decolorant is added in a decoloring solvent, an image formed from the image forming material of the present invention will be decolored more efficiently.

Examples of the decolorant (decoloring agent) are sterol compounds such as animal sterins, plant sterins, and fungi sterins. Examples of the animal sterins are cholesterol, lanosterol, lanostadial, agnosterol, cholestanol, coprostanol, ostreasterol, actiniasterol, spongosterol, and clionasterol. Examples of the bile acid are cholanoic acid, cholic acid, hyodeoxycholic acid, and lithocholic acid. Examples of the plant sterins are stegmasterol, α-sitosterol, β-sitosterol, γ-sitosterol, brassicasterol, and vitamin D. An example of the fungi sterin is ergosterol. These compounds can be used singly or in combination of two or more species. A material such as lanolin alcohol that is originally a mixture can also be used. Derivatives of above decolorant may be used. Specific examples of such a decolorant are methyl cholate, sodium cholate, methyl lithocholate, sodium lithocholate, methyl hyodeoxycholate, choresterol methylcarbonate, pregnenolone, methylandrostenediol, estradiol benzoate, epiandrostene, stenolone, β-sitosterol, pregnenolone acetate, β-chorestanol, 5,16-pregnadiene-3β-ol-20-one, 5α-pregnen-3β-ol-20-one, 5-pregnen-3β,17-diol-20-one 21-acetate, 5-pregnen-3β,17-diol-20-one 17-acetate, 5-pregnen-3β,21-diol-20-one 21-acetate, 5-pregnen-3β,17-diol diacetate, rockogenin, thigogenin, esmiragenin, heckogenin, and diosgenin. These decolorants can be used singly or in a combination of two or more species. A mixture such as lanolin alcohol can also be used.

The decolorant includes cyclic sugar alcohols and their derivatives. Specific examples are D-glucose, D-mannose, D-galactose, D-fructose, L-sorbose, L-rhamnose, L-fucose, D-ribodesose, α-D-glucose pentaacetate, acetoglucose, diacetone-D-glucose, D-glucuronic acid, D-galacturonic acid, D-glucosamine, D-fructosamine, D-isosaccharic acid, vitamin C, erutorubic acid, trehalose, saccharose, maltose, cellobiose, gentiobiose, lactose, melibiose, raffinose, gentianose, melizitose, stachyose, methyl α-glucopyranoside, salicin, amygdalin, euxanthic acid and 1,2:5,6-diisopropylidene-D-mannitol. One or more types of these compounds can be used.

The decolorant includes non-aromatic cyclic compounds of a five-membered or larger ring having a hydroxyl group other than cyclic sugar alcohols, and derivatives of cyclic sugar alcohols. Specific examples are alicyclic monohydric alcohols such as cyclododecanol, hexahydrosalicylic acid, menthol, isomenthol, neomenthol, neoisomenthol, carbomenthol, α-carbomenthol, piperithol, α-terpineol, β-terpineol, γ-terpineol, 1-p-menthene-4-ol, isopulegol, dihydrocarveol, and carveol; alicyclic polyhydric alcohols such as 1,4-cyclohexanediol, t-1,2-cyclohexanediol, phloroglucitol, quercitol, inositol, 1,2-cyclododecanediol, quinic acid, 1,4-terpene, 1,8-terpene, pinol hydrate, and betulin; polycyclic alcohol derivatives such as borneol, isoborneol, adamantanol, norborneol, fenchol, and camphor; and derivatives of cyclic sugar alcohols such as 1,2:5,6-diisopropylidene-D-mannitol.

Examples of polymer decolorant are a polymer compound having a sugar skeleton, polyamino acid, a polymer compound having a hydroxyl group, a polymer compound having an amino group, polyvinylacetal, polyacrylonitrile, and their derivatives, and a mixture thereof.

Examples of the polymer compound having a sugar skeleton are starch such as α-starch, β-starch, corn starch, potato starch, and dogtooth violet starch; grain powders containing starch as its main component such as wheat flour, barley flour, rye flour, and rice flour; starch derivatives such as methylstarch, ethylstarch, acetylstarch, and nitrostarch; cellulose; cellulose derivatives such as cellulose acetate, methylcellulose, ethylcellulose, and nitrocellulose; polysaccharides and their derivatives such as dextrin, dextran, mannan, amylopectin, amylose, xylan, glycogen, inulin, lichenin, chitin, hemicellulose, pectin, vegetable gum, agarose, carrageenin, and saponin.

Examples of polyamino acid are a homopolymer of amino acid having a hydroxyl group, amino group, or oxycarbonyl group and a derivative of the amino acid, or a copolymer containing 5% or more of the amino acid and its derivative such as threonine, serine, cystine, hydroxyproline, tryptophan, aspartic acid, glutamic acid, arginine, lycine, ornithine, and histidine.

Glycoprotein in which sugar and protein are bonded also functions as the polymer decolorant. Examples of the glycoprotein are collagen, Taka-amylase A, casein, germ glycoprotein, and egg albumin.

A polymer having a hydroxyl group may be any polymer if only it can adsorb physically or chemically the developer by donating electrons from lone-pair of oxygen atoms. From this viewpoint, a phenolic resin that has a phenolic hydroxyl group and exhibits a developing function is not included in the polymer decolorant. Polyvinyl alcohol is a typical example of the polymer compound having a hydroxyl group. Humidity resistance of the image forming material can be improved by protecting a portion of side-chain hydroxyl groups of polyvinyl alcohol with an acetyl group, an alkyl group, or the like. The ratio of substitution of a hydroxyl group with another group is determined in accordance with the content of the polymer decolorant in the image forming material.

A polymer having an amino group may be a polymer having an aromatic amine or may be a polymer having a non-aromatic amine if only it can adsorb physically or chemically the developer by donating electrons from lone-pair of nitrogen atoms. Preferable examples of the polymer compound having an amino group are homopolymers such as polyvinylpyridine, polyvinylpyrazine, polyvinylpyrimidine, polyvinylimidazole, polyvinylpyrrole, polyvinylcarbazole, polyvinylpyrrolidine, polyvinylpiperidine, polyvinylpiperazine, and polyvinylmorpholine, and a copolymer containing 5% or more of any of monomers containing an amino group. A polymer in which an amino group is introduced to the benzene ring of polystyrene is also usable as the polymer decolorant. Specific examples are polyvinylaniline, polystyrene substituted by a quaternary ammonium salt used as an anion exchange resin, polystyrene substituted by an amino group having an ethylenediamine skeleton, and their derivatives. The substitution ratio of an amino group is arbitrary, but preferably 5% or more.

In order to bringing the solvent contact with the image forming material on a paper sheet, the paper sheet may be immersed in a solution or the solvent may be sprayed onto the paper sheet. Alternatively, stationary such as a decoloring pen containing a decoloring solvent may be used.

As for the image forming material of the present invention, it is found that a good decolored state can be stably obtained under a condition where pH of the image forming material is 7 or more. Therefore, if the pH of the image forming material is adjusted to about 8 by adding a pH control agent, a good decolored state can be obtained. An example of the pH control agent is a basic substance. The basic substance is not particularly limited as long as it does not damage or discolor a paper sheet.

Examples of suitable inorganic basic compounds are calcium chloride, potassium hydroxide, calcium hydroxide, sodium hydroxide, barium hydroxide, magnesium hydroxide, ammonium carbonate, potassium carbonate, calcium carbonate, sodium carbonate, magnesium carbonate, ammonium hydrocarbonate, potassium hydrocarbonate, sodium hydrocarbonate, alkaline metal borates, tripotassium phosphate, dipotassium hydrophosphate, calcium phosphate, trisodium phosphate, and disodium hydrophosphate.

Examples of suitable organic basic compounds are primary to tertiary amines and quaternary ammonium salts. Examples of the counter ions of the quaternary ammonium salts are a hydroxyl ion, halogen ion, and alkoxide ion.

Examples of the non-aromatic organic basic compounds are those having an aliphatic hydrocarbon group having 1 to 50 carbon atoms or an alicyclic hydrocarbon group having 1 to 50 carbon atoms. These hydrocarbon groups may be substituted by at least one substituent selected from the group consisting of vinyl group, ethynylene group, ethynyl group, oxy group, oxycarbonyl group, thiocarbonyl group, dithiocarbonyl group, thio group, sulfinyl group, sulfonyl group, carbonyl group, hydrazo group, azo group, azido group, nitrilo group, diazoamino group, imino group, urea bond, thiourea bond, amide bond, urethane bond, and carbonyldioxy group.

Examples of aromatic organic basic compounds are those having an aromatic ring such as benzene ring, biphenyl ring, naphthalene ring, tetralone ring, anthracene ring, phenanthrene ring, indene ring, indan ring, pentalene ring, azulene ring, heptalene ring, and fluorene ring. The aromatic ring may be substituted by an aliphatic hydrocarbon group having 1 to 50 carbon atoms or an alicyclic hydrocarbon group having 1 to 50 carbon atoms. Further, the hydrocarbon group may be substituted by a substituent given above.

Examples of the cyclic amines are aziridine, azetidine, pyrroline, pyrrolidine, indoline, pyridine, piperidine, hydropyridine, quinoline, isoquinoline, tetrahydroquinoline, tetrahydroisoquinoline, acridine, phenanthrizine, phenanthroline, pyrazole, benzimidazole, pyridazine, pyrimidine, pyrazine, imidazole, histamine, decahydroquinoline, pyrazoline, imidazoline, imidazolidine, piperazine, cinnoline, phtharazine, quinazoline, quinoxaline, dihydrophenazine, triazole, benzotriazole, triazine, tetrazole, pentamethylenetetrazole, tetrazine, purine, pteridine, carboline, naphthyridine, indolizine, quinolizine, quinuclidine, oxazole, oxazolidine, benzoxazole, isoxazole, anthranil, oxazine, oxazoline, thiazole, thiazolidine, benzothiazole, benzothiazoline, isothiazole, thiazine, azoxime, furazane, oxadiazine, thiadiazole, benzothidiazole, thiadiazine, dithiazine, morpholine, hexamethylenetetramine, and diazabicycloundecene.

Examples of usable organic basic compounds other than those enumerated above are amidine, guanidine, aminoguanidine, urea, thiourea, semicarbazide, thiosemicarbazide, and carbonohydrazide.

In the present invention, the basic compounds can be mixed as they are with the other components of the image forming material. Also, it is desirable to mix the basic compound encapsulated in microcapsules with the other components of the image forming material.

In the present invention, a step of heating the image forming material may be added after solvent decoloration in order to obtain a good decolored state. When such a method is employed, it can be obtained an effect of controlling the state of paper sheet by removing completely the solvent remaining in the paper sheet.

EXAMPLES

Examples of the present invention will be described hereinafter. In the following examples, an image was formed on a paper sheet of 500BLATT manufactured by NEUSIEDLER, as long as otherwise specified.

Example 1

Two parts by weight of Crystal Violet Lactone (CVL) as a color former, two parts by weight of propyl gallate as a developer, one part by weight of polypropylene wax as a wax component, 94 parts by weight of polystyrene (SB-130 manufactured by Sanyo Chemicals Co., Ltd.) as a binder resin and one part by weight of charge control agent (LR-147 manufactured by Nippon Carret Inc.) were mixed, and the mixture was kneaded using a kneader. The kneaded product was pulverized by a pulverizer to obtain a powder having an average particle size of 10 $\mu$m. One percent by weight of hydrophilic silica was externally added to the powder to prepare blue electrophotographic toner. The resultant toner was put into a toner cartridge of a copier (Premage 38 manufactured by TOSHIBA CORP.), and a bar code image was transferred on a paper sheet. As a result, a bar code image having reflection density of about 0.6 could be obtained. By reading the bar code image with a bar code reader (BHT-5075-T manufactured by TEC Company), it was confirmed that bar code data were able to be input.

The paper sheet on which the bar code image was formed was immersed into diethoxyethane, and then was air-dried. After the immersion into the solvent, the reflection density became about 0.1, and the image could not be read with the bar code reader.

A bar code image was transferred again to the paper sheet after decoloration by using the copier. As a result, a bar code image having reflection density of about 0.6 could be obtained. By reading this bar code image with the bar code reader, it was confirmed that bar code data were able to be input. Thereafter, as decoloration and image-formation were repeated, the reflection density of the background was gradually raised. Therefore, when the bar code image formed in the fourth transfer was read with the bar code reader, any bar code data were not able to be input.

The polystyrene resin has a high glass transition point and is relatively hard. Thus, the resin is thermally metastable. The reflection density of the image decolored by the immersion into the solvent did not return to the original reflection density, so that the image did not appear again.

Example 2

Two parts by weight of 3-(4-dimethylamino-2-ethoxyphenyl)-3-(1-ethyl-2-methylindole-3-yl)-4-azaphthalide as a color former, two parts by weight of propyl gallate as a developer, one part by weight of polypropylene wax as a wax component, 94 parts by weight of a styrene-butyl acrylate copolymer, having an acrylate content of 6% by weight, as a binder resin and one part by weight of charge control agent (LR-147 manufactured by Nippon Carret Inc.) were mixed, and the mixture was kneaded using a kneader. The kneaded product was pulverized by a pulverizer to obtain a powder having an average particle size of 10 $\mu$m. One percent by weight of hydrophilic silica was externally added to this powder to prepare blue electrophotographic toner. The resultant toner was put into the toner cartridge of the copier, and a bar code image was transferred on a paper sheet. As a result, a bar code image having reflection density of about 0.8 could be obtained. By reading this bar code image with the bar code reader, it was confirmed that bar code data were able to be input.

The paper sheet on which the bar code image was formed was immersed into diethoxyethane, and then was air-dried. After the immersion into the solvent, the reflection density became about 0.12. It was difficult to recognize the bar code image with the naked eye, and the image could not be read with the bar code reader.

A bar code image was transferred again to the paper sheet after decoloration using the copier. As a result, a bar code image having reflection density of about 0.8 could be obtained. By reading the bar code image with the bar code reader, it was confirmed that bar code data were able to be input. Thereafter, when decoloration and image-formation were repeated, the reflection density of the background was only slightly increased. The bar code image formed in the tenth transfer could be read with the bar code reader.

Any residual image due to flow or blur of the image forming material was not observed on the paper sheet after solvent decoloration. Thus, it was unnecessary to perform an operation to pass the paper sheet through heat rolls in order to erase the image completely.

Example 3

Three parts by weight of 2-chloro-6-(dimethylamino) fluorane as a color former, two parts by weight of methyl gallate as a developer, and 95 parts by weight of polystyrene as a binder resin were mixed, and the mixture was kneaded using a kneader. The kneaded product was pulverized by a pulverizer to obtain a red powder having an average particle size of about 0.5 $\mu$m. Forty parts by weight of this powder, 59 parts by weight of limonene as a solvent, and one part by weight of polyethylene wax as a wax component were mixed, and then sufficiently dispersed with a paint shaker to prepare a red liquid ink. The liquid ink was put on a pen having a round head, and then an image was hand-written on a paper sheet. As a result, an image having reflection density of about 1.0 could be obtained.

The paper sheet on which the image was formed was imersed into diethoxyehtane, and then was air-dried. After the immersion into the solvent, the reflection density became about 0.12. Slight residual images were observed on the paper sheet, but any trace or blur due to flow of dye components was not observed. The residual images could be sufficiently decolored by passing the paper sheet through heat rolls. The paper sheet after decoloration was kept standing at 60° C. for 300 hours, but any image did not appear again. The reflection density after decoloration remained unchanged.

Example 4

One part by weight of Crystal Violet Lactone (CVL) as a color former, one part by weight of propyl gallate as a developer, and 18 parts by weight of an ethylene-vinyl acetate copolymer (ELVAX500W manufactured by Mitsui Dupon Polychemical) as a binder resin were mixed, and the mixture was kneaded using three rolls. The kneaded product was applied in an amount of about 7 g/m$^2$ to a base film for an ink ribbon, using a hot melt coater, so as to make a blue thermal transfer ink ribbon. The ink ribbon was set to a bar code printer (B-30 manufactured by TEC Company), and an image was transferred to a thermal transfer paper sheet (JW-Z103). As a result, a bar code image having reflection density of about 0.7 could be obtained. By reading the bar code image with the bar code reader, it was confirmed that bar code data were able to be input.

On the other hand, 2-butanone was put into writing parts (FV-0200 manufactured by I & J FISNER company) to make a decoloring pen. The decoloring pen was caused to go and return several times on the bar code image formed on the paper sheet so that the image was brought into contact with the solvent, and then the paper sheet was air-dried. After the decoloring operation, blurs of the dye components were slightly generated on the paper sheet. The reflection density became about 0.17, and the image could not be read with the bar code reader.

A bar code image was again transferred to the paper sheet after decoloration using the bar code printer. As a result, a bar code image having reflection density of about 0.7 could be obtained. By reading the bar code image with the bar code reader, it was confirmed that bar code data were able to be input. However, since the ethylene-vinyl acetate copolymer has a low glass transition point and is relatively soft, the image was not thermally stable. Therefore, when the paper sheet after solvent decoloration was heated for a short time, it turned into a color-developed state easily.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A decoloring method of an image using a material comprising a color former, a developer and a binder resin, which is applied to a paper sheet, comprising steps of:

heating the paper sheet so that the binder resin adsorbs the color former and a cellulose component of the paper sheet adsorbs the developer when the temperature of the paper sheet is raised, thereby shifting an equilibrium between the color former and the developer to a non-developed side; and keeping the state shifted to the non-developed side when the temperature of the paper sheet is lowered.

2. The method according to claim 1, wherein the binder resin is a non-polar resin.

3. The method according to claim 1, wherein the binder resin comprises 90% or more by weight of a non-polar monomer.

4. The method according to claim 1, wherein the binder resin is selected from the group consisting of polystyrene, and polystyrene derivatives and styrene copolymers comprising 90% or more by weight of a styrene monomer.

* * * * *